United States Patent
Courtice

(10) Patent No.: US 9,860,819 B2
(45) Date of Patent: Jan. 2, 2018

(54) WIRELESS DEVICE LINK METRIC FOR EFFECTIVE COMPARISON OF MULTI-HOP ROUTES IN WIRELESS MESH NETWORKS

(71) Applicant: Cooper Technologies Company, Houston, TX (US)

(72) Inventor: Harry John Courtice, Windsor (AU)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 14 days.

(21) Appl. No.: 13/752,744

(22) Filed: Jan. 29, 2013

(65) Prior Publication Data

US 2014/0213191 A1 Jul. 31, 2014

(51) Int. Cl.
*H04W 24/02* (2009.01)
*H04W 40/12* (2009.01)
*H04L 12/729* (2013.01)

(52) U.S. Cl.
CPC .......... *H04W 40/12* (2013.01); *H04L 45/125* (2013.01)

(58) Field of Classification Search
None
See application file for complete search history.

(56) References Cited

U.S. PATENT DOCUMENTS

| | | | |
|---|---|---|---|
| 7,558,818 B2 | 7/2009 | Joshi et al. | |
| 2004/0008663 A1* | 1/2004 | Srikrishna | H04L 45/00 370/351 |
| 2004/0264372 A1 | 12/2004 | Huang | |
| 2006/0187884 A1* | 8/2006 | Ma | H04W 40/16 370/332 |
| 2008/0069034 A1 | 3/2008 | Buddhikot et al. | |
| 2008/0181124 A1* | 7/2008 | Chari | 370/252 |
| 2010/0172249 A1* | 7/2010 | Liu | 370/252 |
| 2011/0075566 A1 | 3/2011 | Bellur et al. | |
| 2011/0228705 A1* | 9/2011 | Aguirre et al. | 370/254 |
| 2012/0106383 A1* | 5/2012 | Gormley | H04L 1/0026 370/252 |
| 2013/0021927 A1* | 1/2013 | Yokoo | G01S 5/0252 370/252 |
| 2013/0215932 A1* | 8/2013 | Shuey et al. | 375/133 |

OTHER PUBLICATIONS

Draves et al, Routing in Multi-Radio, Multi-Hop Wireless Mesh Networks, 2004.*
Mishra et al, Design and Implementation, 2010 https://www.cse.iitb.ac.in/synerg/lib/exe/fetch.php?media=public:students:advait:advait-07305032-stage-2-report.pdf.*
Draves, R. et al.; Comparison of Routing Metrics for Static Multi-Hop Wireless Networks; SIGCOMM'04; Aug. 30-Sep. 3, 2004; 12 pages; Portland, OR, USA.
Patent Examination Report No. 1 of AU Patent No. 2013203126; dated Aug. 13, 2014; 6 pages.
Park, J. et al.; A Multipath AODV Routing Protocol in Mobile Ad Hoc Networks with SINR-Based Route Selection; IEEE International Symposium on Wireless Communication Systems; Oct. 21-24, 2008; pp. 682-686.

* cited by examiner

*Primary Examiner* — James Yang
(74) *Attorney, Agent, or Firm* — Armstrong Teasdale LLP

(57) ABSTRACT

Link metrics for communication paths in multi-hop wireless mesh networks of industrial radio device are determined based on signal strength and traffic level performance of each link in the communication paths. A path metric is determined from the link metrics and path metrics are compared and utilized for optimal routing of messages through the network.

29 Claims, 2 Drawing Sheets

WIRELESS DEVICE LINK METRIC FOR EFFECTIVE COMPARISON OF MULTI-HOP ROUTES IN WIRELESS MESH NETWORKS

BACKGROUND OF THE INVENTION

The field of the invention relates generally to input/output devices for wirelessly communicating data in industrial monitoring and control systems, and more specifically to radio frequency (RF) mesh network communication systems.

Supervisory Control and Data Acquisition (SCADA) systems are in widespread use for monitoring and controlling industrial processes of all types. Such SCADA systems typically include a number of remotely monitored locations including sensors, and data and information associated with the sensors at each of the remotely monitored location are communicated via a communications network to other locations, and ultimately to a centralized computer system that manages data collected and controls operation of the industrial process, equipment or facilities associated with the industrial processes. Control commands can likewise be sent to the remote locations using the communications network. In certain applications, the use of long and/or short range radio devices in the data communication networks is highly desirable, and thus RF communication devices have generally been adopted in certain industries for SCADA systems.

In state-of-the-art industrial data communication systems for monitoring and control purposes, spread-spectrum, frequency-hopping RF technology is implemented in mesh network topologies. In such systems, a number of radio devices are arranged to establish a communications network wherein each radio device may communicate with multiple other devices in the network. The spread spectrum technique spreads the RF energy over a predetermined communication channel or channels to reduce the effect of interference as the network operates, while frequency hopping allows the radio devices to use multiple frequencies. Such frequency diversity increases the robustness of each signal path between radio devices in the network, and may effectively overcome interference, destructive reflections or null spots that would otherwise disrupt communications. Mesh networking of the radio devices also provides redundant signal paths such that, even if certain signal paths become unavailable or inoperable to communicate data, communications may still be transmitted using alternate signal paths.

While frequency hopping radio frequency (RF) mesh networks are advantageous in many aspects, they are not without problems, and improvements are desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figure 1:
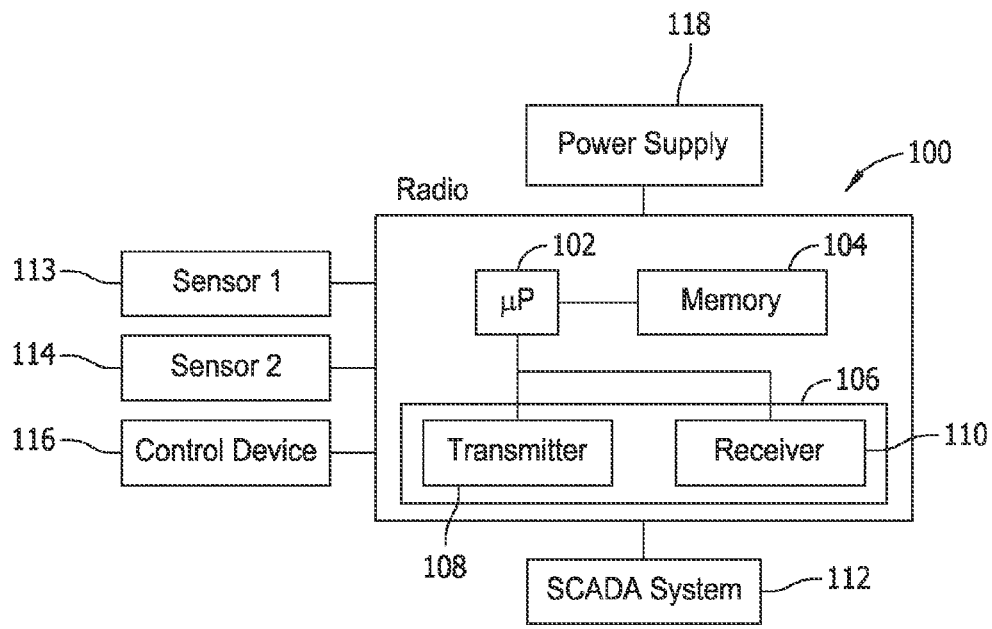
FIG. 1 is a schematic diagram of an exemplary industrial input/output device for wirelessly communicating data in an industrial SCADA system.

FIG. 1 is a schematic diagram of an exemplary industrial input/output device 100 configured to receive input data regarding an industrial process and to communicate the data to a remote location using wireless transmission techniques. More specifically, and as explained below, the input/output device is a radio device 100 that, in combination with other similar devices, may be used to establish a multi-path, wireless data communications network for industrial monitoring and control purposes as further described below.

In the example shown, the radio device 100 is a programmable processor-based device including a processor 102 and a memory storage 104 wherein executable instructions, commands, and control algorithms, as well as other data and information such as communication network and protocol parameters required to satisfactorily operate the radio device 100 are stored. The memory 104 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as shown for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

The radio device 100 also includes a radio transmission element 106 that may include a transmitter 108 and a receiver 110. The transmitter 108 and receiver 110 may be separately provided from one another, or alternatively may be combined into a single device referred to as a transceiver. The radio transmission element 106 sends and receives wireless data signals using known radio frequency transmission techniques. The data and information communicated with the radio transmission element 106 may be processed, formatted or converted into an appropriate communications protocol by the processor 102 utilizing information stored in the memory 100. For example, digital radio frequency signals may be transmitted and received using a specified protocol for the contents of the data messages sent in a particular communications network. Parameters for network communication may include data and information such as the size (i.e., the number of bits) of the data signals transmitted, the order of bits constituting the message, unique radio identifiers, hardware and software version codes, security codes, diagnostic codes and the like as those in the art will appreciate.

Additionally, desirable signal processing such as amplification, filtering, signal conversion (e.g., digital to analog conversion), and diagnostic procedures may be performed. Algorithms and instructions for executing specific communication protocols and procedures are stored in the memory 104, for example, and executed by the processor 102 to communicate information over a communication network, which may be part of a SCADA system 112. The radio device 100 may be part of a remote terminal unit (RTU) in a SCADA system 112.

The radio device 100, as shown in FIG. 1, may be connected to inputs such as sensors, transducers and like monitoring or condition detecting elements associated with the industrial process being monitored and controlled (collectively referred to herein as "sensors") indicated by the reference numerals 113 and 114 and an output element 116 such as a control device for an industrial process. The sensors 113 and 114 generate and provide control feedback signals indicative of the state of the industrial process, and the control device 116 provides for adjustment of the monitored process at the point of the sensors 113 and 114 to effect changes in the state. A variety of sensors are known to detect various aspects of the monitored state which may correspond to a machine state, a component state, a process step, or other parameter of interest to the SCADA system 112. As examples only, monitored aspects of an industrial process detected by the sensors 113 and 114 may include electrical states or conditions (e.g., current or voltage conditions), mechanical states or conditions (e.g., position, velocity, acceleration, stress and strain), a physical state or condition (e.g., temperature, phase, or formulation), an environmental state or condition (e.g., noise, vibration, air quality) and other states or conditions of interest.

A variety of control devices 116 are also known and familiar to those in the art, any of which may be utilized to maintain desired states or conditions of the industrial process, effect changes in states or conditions of aspects of the industrial process, and respond to abnormal or unaccepted states or conditions at various points of interest in the industrial process, related equipment and/or related facilities. The control device 116 may include or may coordinate, switching elements, machine controls or component controls to affect a change in state or condition without human intervention, may interrupt the industrial process to avoid undesirable results stemming from detected states or conditions, or may activate alarm elements and features for response and decisions to be made by human persons. It is understood that the control element 116 may be in the same or different physical location as the sensors 113, 114. That is, the control element 116 may be located upstream or downstream from the sensors 113, 114 in the industrial process such that in practice the sensors 113, 114 and the control element 116 may not be connected to the same radio device 100.

Furthermore, while two sensors 113, 114 and one control device 116 are shown, it is understood that other numbers of sensors and control devices may alternatively be connected to the radio device 100 or to radio devices 100 with like effect. In different embodiments, the sensors 113 and 114 may be hard wired to the radio device 100, may wirelessly communicate with the radio device 100, or be combinations of hard-wired and wireless devices. Typically, a number of radios 100 are distributed throughout the industrial process, with each radio 100 connected to different sensors to provide control inputs and feedback throughout the industrial process, and the radios communicating in a network using the specified communication protocol.

In addition, instead of dedicated sensors and control devices as shown, the functions of these devices could be combined in one or more input/output devices that are capable of bi-directional communication with the radio device or devices 100. In any event, data and information collected via the sensors and/or control devices is collected by each radio device 100 in the SCADA system 112, and communicated to a remote location using the specified communications protocol. Additionally, information such as control commands may be received by the radio device 100 from a remote location according to the specified communication protocol, and sent to the control device 116.

In the example shown in FIG. 1, the radio device 100 is implemented as a sensor node in the larger SCADA system 112. That is, the radio device 100 inputs or receives output signals from the sensors 113 and 114 and outputs or transmits data signals for communicating the sensor signals to a remote location using the proper communications protocol. In another implementation, however, the radio device 100 may function as a control node. When implemented as a control node, the radio device 100 does not directly communicate with any sensor, but rather receives data signals from other radio devices in the network and re-transmits those communications according to the proper communications protocol. In an exemplary embodiment, the radio device 100 is capable of operating in both sensor and control nodes and may be interchangeably used as either one, although if desired dedicated sensor radios and dedicated control radios could alternatively be utilized.

The radio device 100 may be configured as a long range radio device capable of transmitting and receiving radio frequency signals wirelessly over distances of 10-20 km, for example. Compared to other radio devices, the radio device 100 may be considered a relatively high power device designed to broadcast signals over extended distances. An external power supply 118 is therefore connected to the radio device 100, as batteries and other energy storage devices would not provide sufficient power levels to continuously operate the radios over extended time periods as SCADA systems sometimes require.

In different embodiments, the external power supply 118 may be an alternating current (AC) or direct current (DC) power supply coupled to the radio device 100 with an external power line or cable, for example. Generally permanent, hard wired power connections may be established using known screw terminal connections or other suitable techniques for such relatively high powered devices. Additionally, transformers, power amplifiers and the like may be provided in the device 100 to step or step down power supplied from the external supply 114 as necessary, as well as AC to DC or DC to AC converters that may be desirable.

Of course, the radio device 100 may alternatively be configured as a short range radio for communication over shorter distances. When configured as a short range radio, the device 100 may be adequately powered, if desired, by battery devices or other on-board power supplies as those in the art would appreciate. Likewise, short range radio devices may be powered by an external power supply 118 as desired. Any given network of radio devices may include combinations of long and short range radio devices.

Figure 2:
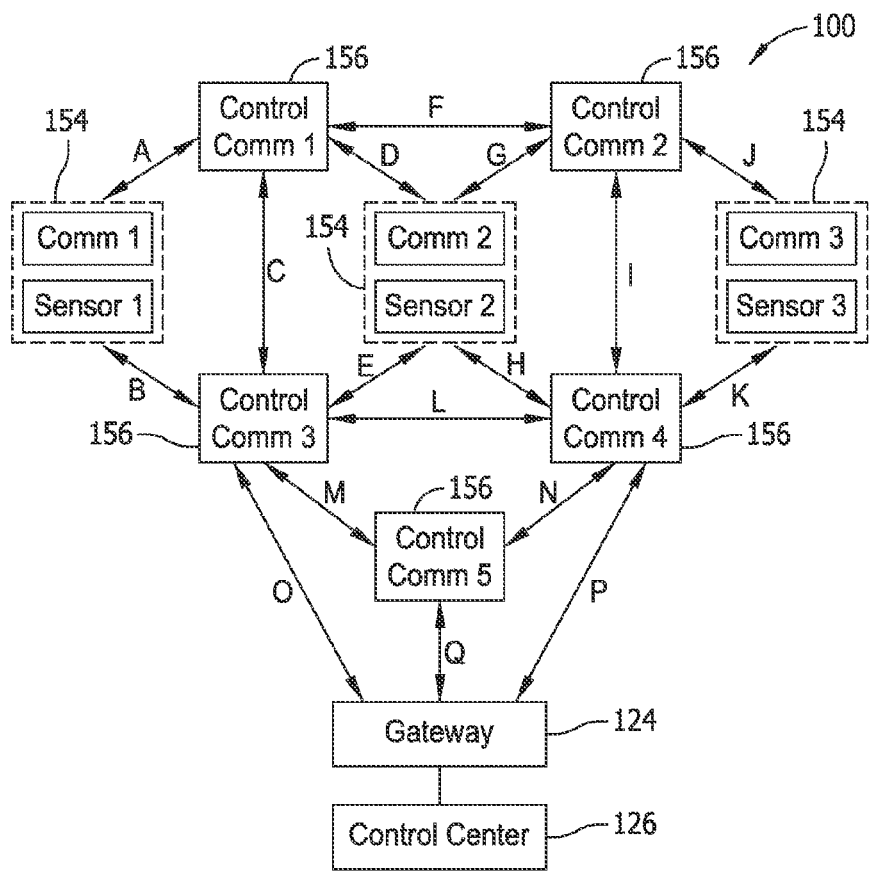
FIG. 2 schematically illustrates an exemplary mesh communication network defined by a plurality of input/output devices such as that shown in FIG. 1.

FIG. 2 schematically illustrates an exemplary installation layout of a communications network 120 established with radio devices such as the devices 100 described above. In FIG. 2, the radio devices are generally indicated as part of sensor communication nodes 154 or control communication nodes 156. As shown in FIG. 2, the sensor nodes 154 are associated with one or more sensors at specific points of interest in the industrial process, while the control nodes 156 are associated with sensor nodes 154. Generally speaking, the sensor nodes 154 transmit data signals including state information as detected by the sensors, and the control nodes 156 establish communication paths to and from the sensor nodes 154 and remote command and control centers for the SCADA system.

That is, as shown in FIG. 2, the sensor nodes 154 monitor one or more local operating characteristics of the industrial process proximate their connection locations. In various embodiments, the sensor communication nodes 154 may be mounted on poles, for example, or may alternatively be provided above ground on another support structure, on the surface of the ground, or in the ground in various installations. The control communication nodes 156 are arranged about and interspersed with the sensor communication nodes 154, and are arranged in a mesh network providing multiple wireless communication paths, labeled A through Q in the example of FIG. 2, between the sensor communication nodes 154 and the control communication nodes 156, between the different communication nodes 156, and from the communication nodes 156 to a signal collector or gateway device 124.

The gateway device 124 is itself a processor-based radio device configured to communicate with the sensor nodes 154 and control communication nodes 156. In exemplary embodiments, the gateway device 124 may be a dedicated device specifically adapted for gateway functionality and hence distinct from the radio devices associated with the sensor nodes 154 and the control communication nodes 156. In another embodiment, the radio devices 100 (FIG. 1) that are used to establish the sensor nodes 154 and control communication nodes 156 may be configured to act as gateway devices as needed or as desired.

Broadcast signals from the sensor communication nodes 154 are accordingly transmitted by and amongst the control communication nodes 156 in the network 120 to the gateway device 124. Likewise, control commands may be broadcast from the gateway device 124 and transmitted to a particular sensor node by and amongst the other sensor nodes 124 and/or control communication nodes 156 in the network 120. Because of the multiple and redundant signal paths between the sensor nodes 154, the control communication nodes 156, and the gateway 124 data signals may be reliably transmitted through the communication network 120 to the gateway device 124 even if some of the communication nodes 156 are temporarily compromised (via obstruction, interference, loss of power, etc.), or have failed (via unrecoverable malfunction, damage, defect, etc.) and cannot be used. Paths that cannot be used are sometimes referred to as being "unavailable", and it is possible for communication paths to unpredictably switch state from available to unavailable, and vice versa, as different events occur and as operating conditions change. When paths become unavailable, communications can be re-routed through other available paths. Because the radios are in frequent communication with one another, it will generally be known by any radio which of its neighboring radios within signal range is available, or unavailable, to receive a communication.

Many different mesh topologies are known and may be employed in the network 120. In an exemplary embodiment, the radio devices and associated sensor and control communication nodes are configured to provide a 902-928 MHz, frequency hopping spread spectrum, mesh topology. The mesh network may be algorithmically based and configured to meet specific needs for specific installations. The mesh network may also be self-configuring and self-healing with autorouting and rerouting capability, and is therefore readily scalable. That is the network is readily adaptable and amenable to addition and subtraction of sensor nodes and communication nodes 156.

In exemplary installations, the control communication nodes 156 may be provided in locations spaced from the sensor communication nodes 154, and may be mounted on utility poles, for example, or may alternatively be provided above ground on another support structure, on the surface of the ground, or in the ground in various installations. The spacing of control communication nodes 156 and sensor communication nodes 154 is primarily dependent upon the signal range of the radio devices 100 (FIG. 1) utilized, the actual frequency selected for the communication, and the ambient environment of the nodes 154 and 156. For example, nodes 154 and 156 in above ground installations that are generally free from any obstructions or impediment may be spaced farther from one another than for ground surface or below surface installations.

Digital signal processing transmission techniques utilizing encoded data packets may be employed by the communication nodes 154 and 156 to convey signals including a variety of data and information of interest for a wide variety of devices. That is, the communications protocol may be a byte oriented protocol having multiple bits representative of information of interest. The encoded data and bits of information used to generate data packets for the signals transmitted may include unique radio identifiers corresponding to each of the sensor nodes 154 in the power system, serial numbers for equipment and devices monitored by the sensor nodes, device type codes for monitored equipment and devices, a location code for each sensor node, wireless addresses for the control communication nodes in the signal transmission system, time/date stamps, a software revision code for the application software, a hardware revision code for the gateway device, a data packet count for an incoming message, an error count for incoming data packets and messages, and error codes corresponding to different error conditions for the sensor nodes, the control communication nodes in the signal transmission system, and/or error conditions in the control center 126. Customer identifiers and contact information for operators and maintenance personnel in response to a detected alert or alarm conditions may also be encoded in the signals.

While some exemplary message codes have been described, it is understood that other types of codes, information and data may be included in alternative embodiments, and it is also recognized that less than all of the exemplary protocol bits and codes could be used in other embodiments. Implementation of the message protocols, except as specifically discussed below may be conventionally provided.

The communication nodes 156 are sometimes referred to as repeater/router elements, and the data signals are transmitted among the control communication nodes 156 in a prescribed manner to the gateway device 124. In a further embodiment, one or more of the sensor communication nodes 154 may directly communicate with the gateway device 124, depending on the signal range of the communication nodes and the proximity of the gateway device 124.

Data packets may be reported from the sensor communication nodes 154 on a periodic basis, and data packets may be transmitted repeatedly within specified time periods to ensure that the data packets are completely received, processed, and optionally acknowledged by the gateway device 124. Repeated transmission of data signals avoids collision of signals when more than one of the circuit protectors operates at approximately the same time. Also, the communication nodes 156 may add a routing code, a time stamp or other information to the data packet so that the communication system and signal paths between the sensor communication nodes 154 and the control communication nodes 156 may be monitored.

The gateway device 124 collects the data signals of the communication nodes, and communicates the data signals in the same or different form to control center 126 of the SCADA system 112 (FIG. 1) for processing. More than one gateway device 124 and/or more than one control center 126 may be provided, and a single gateway device 124 may communicate with more than one control center 126. The gateway device 124 may be a network based computer server system, a personal computer, a computer workstation, a programmable logic controller or other electronic controller, a processor-based hand held device or another electronic device or equivalent thereof that may receive, condition, process or interpret signals from the communication nodes 156, and communicate the signals to the control centers 126.

Communication between the gateway device 124 and the control centers 126 may utilize long-range communication schemes such as optical fiber transmission, broadband over powerline systems, WiMAX systems, WiFi systems, Ethernet connections, satellite communications, and the like.

The gateway device 124 may perform data reduction algorithms for processing signal transmissions from the control communication nodes 156 before communicating with the control centers 126. For example, the gateway device 124 may filter incoming data signals and identify duplicate signal transmissions that may occur, for example, when more than one of the communication nodes 156 transmits the same signal to the gateway device 124, or as another example, when the same sensor node 154 signals the communication nodes 156 more than once. Duplicate signals may be discarded or deleted by the gateway device 124 prior to communicating signals to the control centers 126.

Data reduction algorithms performed by the gateway device 124 may also reduce or eliminate information from the data signals that are not necessary for the control center functionality. For example, messaging protocol information pertinent to the radio frequency transmission of the data signals in the network 120 but not pertinent to a messaging protocol for the gateway communication to the control centers 126 may be stripped, eliminated, or deleted from the data signals before transmission to the control centers 126.

The gateway device 124 may also perform authentication, verification, or security algorithms to ensure the integrity of the signals of the communication nodes, as well as perform diagnostic, testing, and troubleshooting procedures to ensure proper installation and operation of the communication nodes 154 and 156.

Communicated signals from the gateway device 124 may be received at the control centers 126 where they may be processed, decoded or interpreted using appropriate hardware and software. Interactive, menu driven and graphic displays may be presented to the user at the control station 126, allowing the user to capably oversee the industrial process(es) being monitored in more or less real time as operating conditions change. The user or operator of the software may be prompted to take appropriate action in response to detected events, alarms and alerts may automatically be generated to appropriate persons, and certain protective actions may be automatically undertaken by the control system in response to communication from the sensors.

Additionally, sensed data information and reports may be complied and generated by the gateway device 124 and/or the control centers 126 as a useful tool for proactive management of the monitored industrial process(es).

Having now described the basic operating algorithm features of the gateway device 124 and the control centers 126 functionally, programming of the gateway device and control center equipment to operate in the manner described may be conventionally provided by those in the programming arts without further explanation.

The network 120 may generally be used in a wide variety of industrial applications. Exemplary applications may include: pharmaceutical plants, systems, and production facilities, oil and gas production and distribution systems and facilities; mining production and refining systems and facilities; water and waste water treatment systems and facilities; utility distribution (e.g., natural gas and electric power systems and distribution networks); aquaculture and agricultural production systems and facilities; pulp and paper mill manufacturing systems and facilities; and road and rail network management systems and facilities. Still other applications are possible, as the network configuration capabilities are practically unlimited for use in different end use applications.

While the invention has thus far been described in the context of a single communications network 120, multiple communications networks may be advantageous for the maintenance and oversight of certain industrial systems and facilities. Accordingly the communication networks established with the radio device 100 (FIG. 1) may be established as stand-alone networks, or may share communication nodes with other mesh networks to increase the redundancy and improve reliability of the SCADA system. Various communication networks may be categorized, grouped, or sub-grouped as desired to accommodate complex industrial systems and facilities, or to control different facilities or distribution systems over widespread geographic areas.

For example, the control communication nodes 156 in various mesh networks may be discretely grouped into defined areas and utilize short range communication techniques, with longer range communication techniques being utilized to transmit information between different facilities. Further, it may be desirable to provide mesh networks that may communication with one another through the longer-range gateway device 124, as well as with the central control center 126. Special purpose mesh networks may also be created, and such special purpose mesh networks may overlap wholly or partially with other mesh networks, or may stand alone from other mesh networks.

In further embodiments, providing more than one gateway device 124 may be desirable to further enhance communications by reducing the number of communication nodes needed to reach the gateway device 124, or to facilitate communication between different communication networks. When multiple gateway devices 124 are provided, some communication nodes 156 may communicate selectively with some of the gateway devices but not with others. That is, special purpose gateways may be provided that collect only certain types of messages and ignore others.

The benefits of such mesh communication networks are numerous. The sensor nodes 154 and the communication nodes 156 may be retrofit to existing facilities, equipment and devices, and expensive point-to-point wiring is avoided via the wireless communication. The relatively costly gateway device 124 may be shared by hundreds of communication nodes, lowering overall equipment costs of the system. As mentioned earlier, the additional nodes can either be allowed to communicate with the nodes within its own family group, or they can use existing nodes to assist in the meshing capability of the network, leading to further cost savings.

Expansion of the network 120 may be accomplished by simply adding communication nodes 154 and 156 in the signal range of other communication nodes 156. The node count may be rapidly expanded to accommodate growth and changes in monitored industrial processes and facilities. Regardless of expansion or modification of the power system 100, given the low relative cost of the communication nodes, additional communication nodes can be readily added into the network to monitor additional points of interest if desired.

Communication between the nodes 156 and the gateway device 124 may be bi-directional, facilitating transmission of control signals corresponding to command instructions from the control centers 126 to a specific location in the monitored industrial process.

The communications protocol is adaptable to communicate virtually any type of information or type of data to the control center, and control decisions could be made based upon the communicated information. In certain networks of the type described, and particularly in frequency hopping, radio frequency mesh networks, certain problems can occur.

Generally speaking, it is often possible for a message to be routed along more than one message path in the network. For example, the illustrated network in FIG. 2 shows multiple paths to possible destinations in the network. As one example, considering the Comm 1 radio station 154 in FIG. 2, if a message is to be sent to a destination such as the gateway 124, one possible communication path to the gateway 124 is indicated by arrow B that represents a communications link with Control Comm 3 radio station 156, and arrow O that represents a communications link from Control Comm 3 to the gateway 124. This path is referred to herein as a two-hop path because it involves two links (indicated by arrows B and O) between radio stations Comm1, Comm 3 and the gateway 124.

Another possible path, however, from the Comm 1 radio station 154 in FIG. 2 to the gateway 154 is indicated by arrow B representing a communication link with Control Comm 3 radio station 156, arrow M representing a communication link between Control Comm 3 to Control Comm 5, and Arrow Q representing a communication link from Control Comm 5 to the gateway 124. This path is referred to herein as a three-hop path because it involves three links (indicated by arrows A, M and Q) between radio stations Comm1, Comm 3, Comm 5, and the gateway 124. It should now be evident that still other paths involving different numbers of hops are possible from Comm 1 to the gateway 124.

FIG. 2 also reveals multiple paths having different number of hops for the Comm 1 radio station to communicate to other destinations on the network, including the other radio stations 154 (e.g., Comm 2 and Comm 3) depicted. Thus, the Comm 1 radio station may in general transmit messages to a number of possible destinations in the network along different message paths. Likewise, the other radio stations 154 (e.g., Comm 2 and Comm 3 stations 154) are provided with multiple communication paths to communicate messages to various destinations in the network, whether the gateway 124 or other radio stations 154, 156.

Conventionally, some attempt has been made to determine the most optimal route for message transmission between radio stations in the network to route a message from a source radio to a destination radio. A variety of path metrics are known for such purposes and typically account for the number of hops involved in transmitting a message, an expected number of radio transmissions to complete the message, an expected round trip time for the message transmission, etc. Such metrics can be effective to some extent, but tend to be rather complex and accordingly can be costly to implement. Existing path metrics have yet to fully realize the potential of mesh networks to efficiently communicate messages in a low cost manner. Improvements are desired.

Some known communication protocols for mesh networks of the type described includes radio stations which are configured to determine the number of hops necessary to transmit a message along available paths to a destination, and to automatically select paths with smaller number of hops over paths with larger numbers of hops. For example, if two communication paths are available to transmit a message from a source radio to a destination radio, and one of the paths involves two radios to transmit the message to the destination in the network (i.e., is a two-hop communication path) while the other involves three radios to transmit the message to the destination in the network (i.e., is a three-hop communication path), the shorter, two-hop path is presumed to be the better choice and is used by the transmitting radio to send a message to the destination.

However, the assumption behind the approach to automatically select paths with lower numbers of hops, namely that shorter message paths are always preferable to longer ones, is not always correct. This is particularly so when some of the links traversed by a shorter path are marginal, either because of poor signal strength, high traffic, or a combination of both. In such a case, a message may need to be re-transmitted a number of times until it successfully traverses the marginal link (or links) in the message path. Depending on how many re-transmissions are necessary for such links in a shorter path, a message could successfully be sent along a longer path in about the same time, or perhaps in less time, than it could be over the shorter path. It is therefore possible that better network performance may result from utilizing a longer path having more hops, but consisting of links with better performance than a shorter path. In such circumstances, the protocol to use shorter paths by default effectively ignores better performing message paths that may be present and available for use.

It is likewise possible that two paths with an equal number of hops may provide significantly different actual performance when transmitting messages along the two respective paths because one of the paths may involve a marginal link or link that will likely require a number of re-transmissions to successfully traverse the path. Simple protocols to select shorter paths by default generally lack capability to assess performance issues between paths of the same length.

Path metrics are needed that can accurately assess communication paths of varying length and also communication paths of the same length in a relatively simple and cost effective manner. Such path metrics are provided in the exemplary systems, methods, and algorithms described below.

Figure 3:
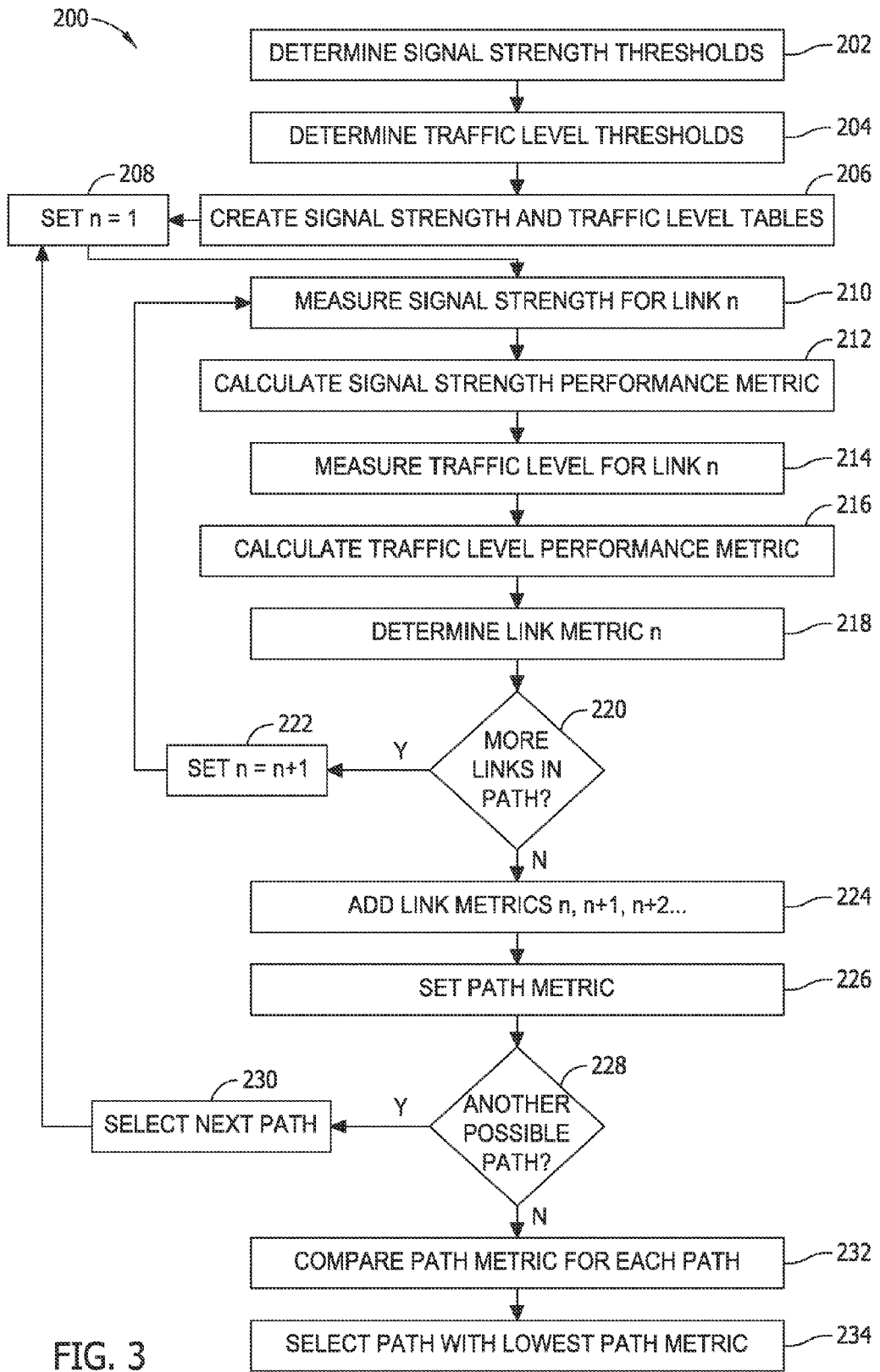
FIG. 3 illustrates a flow chart of a link metric algorithm allowing an effective comparison of message routes in the network shown in FIG. 2.

More specifically, and as shown in FIG. 3 a process algorithm 200 is proposed that determines path metrics by evaluating the individual links completing a communication path. That is, link metrics are first assessed, and based on the link metrics, path metrics can be determined to identify and utilize higher performing paths, regardless of path length, to route a message through the network 120 to any given destination. The algorithm 200 may be implemented in the processor-based radio device 100 (FIG. 1) used at the communication stations 154, 156 (FIG. 2) in the network 120.

The link metrics, as explained below, allows for an effective and efficient comparison of different possible paths within a network, including but not limited to comparing possible paths having different numbers of hops. As discussed above, some of the possible paths for any given message transmission may be short (i.e., have a smaller number of hops) but offer relatively poor performance (e.g., poor signal strength, a poor bit error rate, etc.), while other possible paths for the given message transmission may be longer (i.e., have a larger number of hops) but offer relatively better performance per link. The link metrics, which are performance based, therefore allow a meaningful and accurate comparison of the different possible paths for optimal message routing through the system in a manner that conventionally is not believed to exist.

As seen in FIG. 3, the algorithm 200 establishes a link metric based on two measured aspects of any given link that may possibly be used to route a message from a source to a destination on the network. In particular, the signal strength for each of the links and the traffic level at each node are individually evaluated. By doing so, the algorithm 200 effectively estimates the number of (re)transmissions of a message required for the message to traverse the link. The algorithm 200 establishes a link metric for a set of links that can be added link-by-link to provide a valid comparison between two possible paths making use of different sets of links, allowing selection of the better of the two paths for message routing purposes. Because of the individual evaluation of the links, message paths having different numbers of hops can effectively be compared to one another from a performance perspective, as well as allowing effective comparison of two paths having the same length.

As shown in FIG. 3, in order to conduct the link evaluation, threshold signal strength parameters and threshold traffic level parameters are established at steps 202 and 204, respectively. These thresholds, which are predetermined, provide a basis to evaluate actual performance of each link in the network at any given point in time, and are tabulated as shown at step 206. Exemplary thresholds are shown, for example, in one dimensional tables such as those below which are combined below in Table 1. In another embodiment, the signal strength and threshold values could be tabulated in separate tables if desired. Where multiple data transmission rates are possible for message transmission in the network, a separate set of signal strength and traffic level threshold value tables may be used for each applicable data rate.

TABLE 1

| Signal Strength: | | | | | | | | |
|---|---|---|---|---|---|---|---|---|
| −80 dBm | −85 dBm | −89 dBm | −93 dBm | −96 dBm | −99 dBm | −101 dBm | −103 dBm | −104 dBm |
| Traffic Level: | | | | | | | | |
| 10% | 16% | 21% | 25% | 28% | 30% | 32% | 33% | 34% |

The threshold values signal strength and traffic level values shown are exemplary only and different threshold values, both greater and smaller than those shown in Table 1 may be utilized. The signal strength and traffic level threshold values may be developed empirically or experimentally, based on the specifications or actual behavior of the Medium Access Control (MAC) layer in the case of the traffic level and the physical layer in the case of signal strength to optimize message transmission as explained below.

The signal strength and traffic level threshold values are strategically set according to two basic premises or assumptions. First, higher signal strength links are preferable to lower signal strength links. Second, nodes experiencing lower traffic level are preferable to those experiencing higher traffic levels. Accordingly, the signal strength thresholds are presented in the table in positions 1 through x where x is the number of signal strength thresholds utilized, and the traffic level thresholds are presented in the table in positions 1 through y where y is the number of traffic level thresholds presented. For the signal strength thresholds, the threshold values are ordered in the positions 1 through x from highest to lowest, and for the traffic level thresholds, the threshold values are ordered in the positions 1 through y from lowest to highest.

In the example of Table 1, the position 1 signal strength threshold is −80 dBm, the position 2 signal strength threshold is −85 dBM, and since x is 9 in this example, the position 9 signal strength is −104 dBM. These thresholds 1 through x define various signal strength performance ranges of a link that can be used to evaluate actual link performance at any given point in time. In the example, shown, the performance ranges indicated by the threshold values are not the same between the all of the positions. For example, there is a 5 dBM difference between the position 1 and position 2 signal strength threshold values shown in Table 1, whereas there is a 4 dBM difference between the position 2 and position 3 dBM values in Table 1. In another embodiment, however, the differences between the position threshold values in the positions 1 through x may be the same.

Also in the example of Table 1, the position 1 traffic level threshold is 10% of the maximum level that the routing node is able to sustain, the position 2 traffic level threshold is 16%, and since y is 9 in this example, the position 9 traffic level is 34%. These thresholds 1 through y define various traffic level performance ranges of a link that can be used to evaluate actual link performance at any given point in time. In the example, shown, the performance ranges indicated by the threshold values are not the same between the all of the positions. For example, there is a 6 point difference between the position 1 and position 2 traffic level threshold values shown in Table 1, whereas there is a 5 point difference between the position 2 and position 3 traffic level values in Table 1. In another embodiment, however, the differences between the position threshold values may in positions 1 through y may be the same.

In the exemplary Table 1 as shown, nine signal strength thresholds are shown and nine traffic level thresholds are shown. Greater or fewer thresholds may be utilized in other embodiments, however, and the number x of signal strength thresholds and the number y of traffic level thresholds need not be the same. In general, the more thresholds that are implemented, the more accurate the algorithm will be in determining and distinguishing performance variations between possible links being considered for routing a message.

Each of the x signal strength thresholds and they traffic level thresholds provides approximate performance levels, determined in advance, as a basis to compare actual performance of the link in use. In contemplated embodiments, steps 202, 204, 206 are preparatory to operation of the radio devices and the table(s) of step 206 is programmed into the memory of the processor-based radio devices 100 (FIG. 1). The remaining steps of the algorithm 200 may be performed by the processor-based device as described below.

At step 208, n is initially set to 1, and represents the first link in a possible path to communicate a message to another radio device. At step 210, the signal strength of the first link is measured by the processor-based radio device for the first link. At step 212, a first performance metric, namely a signal strength performance metric, is calculated by comparing the measured value to the threshold signal strength values in the table. Following the above example, and according to one exemplary embodiment, the signal strength performance metric may be calculated by counting the index of the table (e.g., Table 1) where the threshold signal strength value drops below the measured value. In other words, the signal strength performance metric is calculated to be the position number of the signal strength threshold value that is closest to, but higher than, the measured value. For instance, if a signal strength for a particular link is measured at −87 dBm, the signal strength performance metric is calculated as 3, since the measured signal strength level (−87 dBm) is higher than the third position threshold (−89 dBm in Table 1) in the signal strength threshold table, but lower than the second position threshold (−85 dBm in Table 1).

If the measured signal strength level is found to be higher than (or equal to) the first signal strength threshold (−80 dBm) in the signal strength table, the signal strength metric is calculated as 1.

If, on the other hand, the level is lower than the last threshold (−104 dBm) in the signal strength table, the signal strength performance metric is calculated as ∞ (infinite). This essentially indicates a link of unacceptable performance.

At step 214, the traffic level is measured by the processor-based radio device for the node at the remote end of the first link. The traffic level is not measured for the link itself, but is the total traffic level experienced by the station at the distant end of the link n. In particular, as the path is not yet established, there will likely be no traffic level for the proposed path. Additionally, as the station at the remote end of the link may be participating in the routing of multiple messages on various other paths, it may experience a traffic level much higher than that slated to be carried by the proposed path. This level of traffic should be accounted for when evaluating the node as a potential participant in the routing of messages.

At step 216, a second performance metric, namely a traffic level performance metric, is calculated by comparing the measured value to the threshold traffic level values in the table. Following the above example, and according to an exemplary embodiment, the signal strength performance metric is calculated by counting the index of the table (e.g., Table 1) where the traffic level is closest to but above the measured value. In other words, the traffic level performance metric is calculated to be the position number of the traffic level threshold value that is closest to, but higher than, the measured value. For instance, if the measured traffic level is 22% of the available bandwidth, the traffic level performance metric is calculated as 4, since the measured level (22%) is less than the fourth threshold (25%), but greater than the third threshold (21%) in the traffic level table.

If the measured traffic level is lower than (or equal to) the first threshold in the traffic level table, the traffic level performance metric is calculated as 1.

If the measured traffic level is higher than the last entry, the traffic level performance metric is calculated as ∞ (infinite). This essentially indicates a link of unacceptable performance.

At step 218, the link metric is determined based on the calculated signal strength performance metric of step 212 and the calculated traffic level performance metric at step 216.

In one embodiment, the link metric is determined at step 218 by multiplying the signal strength performance metric of step 212 and the calculated traffic level performance metric at step 216. In other words, the link metric is the product of the signal strength performance metric of step 212 and the calculated traffic level performance metric at step 216. Continuing the above example, if the signal strength is measured at −87 dBm, and the traffic level is measured at 22% of the available bandwidth, the link metric is the signal strength performance metric (calculated to be 3 as described above) times the traffic level performance metric (calculated to be 4 as described above) or 12.

The path metric is therefore an approximate indicator of the performance of the link, based on the performance threshold metrics for signal strength and traffic level in view of the predetermined performance threshold values. In general, a lower calculated link metric indicates a better quality path, and hence links with lower link metrics are preferable to links with higher link metrics for routing a message. The careful reader will now realize that the best possible link metric is 1, representing a high signal strength performance and a low traffic level, while the worst possible link metric is 81, representing the ninth position of the signal strength and traffic level thresholds and a corresponding low signal strength and high traffic level. Thus, in a range of 1 to 81 for the example of Table 1, successively higher link metrics indicate lower signal strength performance and/or higher traffic levels for the link assessed. Thus, a link metric that is determined to be 12 in the example above would be preferred to a link having a metric of 15 but less preferable than a link having a metric of 8. If the determined link metric for two different links is found to be the same, either may be used to route a message. Links having the same calculated link metric should be similar in performance to one another. Any calculated link metric of infinity will effectively exclude the link from being selected.

Because it has been found that performance effects due to signal strength and to traffic level do not significantly cross-correlate in certain types of communication protocols, the determination of the link metric by multiplying the signal strength and traffic level performance metrics provides a meaningful indication of relative link performance when certain types of communication protocols are used. In the example of Table 1, nine signal strength threshold values and nine traffic level thresholds provides a considerable demarcation of different possible performance of the links analyzed. That is, a large number of possible metric values is provided for any link analyzed.

As shown at step 218, the processor-based radio device determines whether there additional links to be considered in selecting a path to transmit a message to a particular destination. The available message paths and associated links to complete the message paths are known to the radio devices and may be identified for evaluation. If there are more links needed to complete the message path, at step 222 n is reset to n+1 and the device returns to step 210. As such, after the first link metric has been determined when n is set to 1, n is set to 2 to evaluate the second link via steps 210-218 and at step 218 the processor-based device determines whether there are still further additional links to consider to complete a message path to the destination. If so, at step 22 n will be reset to 3 and a third link is evaluated via steps 210-218. This will repeat until metric links for all the links in the paths will be determined. The algorithm 200 is accordingly scalable to any number of links and is capable of evaluating message paths having any number of hops.

In contemplated embodiments, the signal strength and traffic level measurements could be periodically taken by the various radios in the network and communicated by the various radios to the other radios in the network. In such an embodiment, each radio device may record and update the measured signal strength and traffic levels to calculate the links needed to assess downstream links in a communication path. In other embodiments, a source radio may request signal strength and traffic levels from other radios along possible message paths so that link metrics can be calculated. Still other variations are possible as those in the art will realize to provide the necessary signal strength and traffic level measurements to determine the link metrics link-by-link along a possible message path.

When it is determined at step 220 that there are no more links in the message path, the link metrics for the n links evaluated are added or accumulated at step 224. The accumulated link metrics for the path is set as the path metric at step 226. As such, if all of the links in a given message path have relatively low metrics, the path metric will be relatively low and indicated good performance of the path. If one or more of the link metrics is found to be relatively high in the message path, the path metric will be higher. If all of the link metrics are found to be relatively high, the path metric will be relatively high. The path metric is therefore an approximation of the performance of the path based on its component links and predetermined performance thresholds. The path metric accordingly indicates a relative estimation of required re-transmissions of messages over the path that allows for a meaningful comparison of different paths. The path metric is not, however, based on complex calculations of actual performance of the path. In other words, the path metric is not based on actual message transmission error rates, calculated round-trip times for messages, and other actual performance attributes upon which known path metrics are based. Instead, the path metrics are based on approximations and simple math, and may be executed more simply and efficiently than more complex methods of obtaining path metrics.

At step 228, the radio device determines whether there is another possible path to the destination for a given message. If so, at step 230 the next path is selected, n is reset to 1 at step 208 and the steps 208-222 are performed for all the links in the selected path, the link metrics are added at step 224 and the path metric for the selected path is set at step 226. If more possible paths are present at step 228, the algorithm returns to step 208 and repeats until all possible paths have a respective path metric determined.

If there are no more possible paths at step 228, the path metrics for the possible paths are compared at step 232. The path with the lowest path metric is then selected to route the message, as this path is expected to offer the best performance. As mentioned above, if more than one path is found to have the same path metric, and that path metric happens to be the lowest of the possible paths available, the message may be sent on any of the paths having the same metric as those paths are expected to offer similar performance in transmitting the message.

It should now be evident that it is possible for a path having more hops to have lower path metric than paths having fewer hops, and thus the radio device may route messages along longer paths having better performing links than shorter paths having relatively poor performance. Optimal operation of the network to efficiently route messages can accordingly be ensured by taking into account actual performance conditions of the links available to route messages and the radio devices are self-adapting to routing messages along higher performing paths, even as path performance changes over time. Dynamic routing of messages is therefore achieved in response to actual operating conditions of the network.

For communication protocols that exhibit significant cross-correlation between signal strength and traffic level in use, a two-dimensional table may be used in an alternative embodiment to provide pre-calculated link metric values depending on the calculated performance metrics as explained below. This concept is illustrated in a second example, wherein when significant correlation exists between the performance effect due to traffic level and due to signal strength, the multiplication of the signal strength performance metric and the traffic level performance metric may be replaced by a lookup table.

An exemplary two dimensional lookup table for path metric determination is set forth below in Table 2 for discussion purposes.

TABLE 2

| | Signal Strength Metric → | | | | | | | | | |
|---|---|---|---|---|---|---|---|---|---|---|
| | 1 | 2 | 3 | 4 | 5 | 6 | 7 | 8 | 9 | ∞ |
| ← Traffic Level Metric | 2 | 5 | 7 | 9 | 12 | 14 | 16 | 19 | 21 | ∞ |
| | 3 | 7 | 10 | 14 | 17 | 21 | 24 | 27 | 30 | ∞ |
| | 4 | 9 | 14 | 15 | 20 | 24 | 29 | 33 | 38 | ∞ |
| | 5 | 11 | 15 | 20 | 25 | 32 | 37 | 43 | 50 | ∞ |
| | 6 | 13 | 18 | 24 | 31 | 40 | 46 | 50 | 62 | ∞ |
| | 7 | 15 | 21 | 29 | 37 | 45 | 60 | 70 | 75 | ∞ |
| | 8 | 17 | 24 | 33 | 43 | 50 | 70 | 80 | 95 | ∞ |
| | 9 | 19 | 27 | 38 | 50 | 62 | 75 | 95 | 150 | ∞ |
| | ∞ | ∞ | ∞ | ∞ | ∞ | ∞ | ∞ | ∞ | ∞ | ∞ |

As shown, signal strength performance metrics are set forth across the top row in the table, and traffic level performance metrics are set forth in the left-most column in the table. Lookup link metrics are provided in the cells representing the possible combinations of signal strength performance metrics and traffic level performance metrics. The link metrics may be determined by empirically or by experimentation as before, and as can be seen in Table 2 the exemplary link metrics in the table are higher than the product of the respective signal strength performance metrics and traffic level performance metrics of each cell. The link metrics shown are exemplary only and other values, both greater and lower than those shown, may utilized in an otherwise similar table.

Following the exemplary scenario discussed above, if for instance a particular link has a measured signal strength of −87 dBm, and the node at the furthest end of the link has a measured traffic level of 22% of its available bandwidth, the signal strength and traffic level performance metrics are calculated as before. That is, the one dimensional tables (e.g., Table 1) are consulted to calculate the signal strength performance metrics and traffic level performance metrics in the manner described above. The signal strength performance metric is accordingly again calculated to be 3 and the traffic level performance metric is calculated to be 4.

Now consulting the lookup table (Table 2), the link metric corresponds to the contents of the cell at column 3 (because the signal strength metric is calculated to be 3) and row 4 (because the traffic level performance metric is calculated to be 4). The content of the this particular cell in the lookup table is seen to be 14, so the link metric is set to be 14.

The values in the lookup table reflect any cross correlation between signal strength and traffic level for the combination of physical layer and MAC layer being used. By loading the lookup table (or tables) into the memory of the radio devices, the lookup table(s) may be utilized to determine link metrics at step 218 of the algorithm 200. The lookup tables provide similar benefits to those described above when the algorithm is implemented.

Having now described the algorithm 200 functionally, it is believed that those in the art could program the radio devices to implement the functionality described without further explanation.

The benefits and advantages of the inventive concepts are now believed to be evident in view of the exemplary embodiments disclosed.

An exemplary embodiment of an input/output device has been disclosed including: a transmitter configured to generate a radio frequency signal transmission; a receiver configured to receive a radio frequency signal transmission; and a processor-based control coordinating transmissions of radio frequency signal transmissions in response to received signal transmissions in a multi-signal path transmission network. The processor-based control is configured to: measure a signal strength value for a first communication link established through at least one neighbouring input/output device; calculate a signal strength performance metric based on the measured signal strength of the first communication link; measure a traffic level value observed by the similar input/output device at the remote end of the first communication link established through the at least one input/output device; calculate a traffic level performance metric based on the measured traffic value of the device at the remote end of the first communication link; determine a link metric for the first communication link, based on the calculated traffic level performance metric and the calculated traffic level performance metric; and utilize the first link metric to evaluate a preferred path for routing of a message.

Optionally, the determined link metric is the product of the calculated signal strength performance metric and the calculated traffic level performance metric. The determined link metric may correspond to a value in a lookup table corresponding to the calculated signal strength performance metric and the calculated traffic level performance metric. The signal strength performance metric may be calculated in reference to threshold values provided in a signal strength table. The signal strength table may include a plurality of threshold signal strength values each arranged in positions 1 through x in the table, and the calculated signal strength performance metric corresponds to the position of the threshold value in the signal strength table that is closest to but higher than the measured signal strength value. The traffic level performance metric may be calculated in reference to threshold values provided in a traffic level table. The traffic level table may include a plurality of threshold traffic level values each arranged in positions 1 through y in the table, and the calculated traffic level performance metric corresponds to the position of the threshold value in the traffic level table that is closest to but lower than the measured traffic level value.

As further options, a communication path may include the first communication link and at least a second communication link, and wherein the processor-based control is further configured to: measure a signal strength value for the second communication link; calculate a signal strength performance metric based on the measured signal strength of the second communication link; measure a traffic level value observed by the input/output device at the remote end of the second communication link; calculate a traffic level performance metric based on the measured traffic value of the device at the remote end of the second communication link; determine a link metric for the second communication link, based on the calculated traffic level performance metric and the calculated traffic level performance metric; and utilize the second link metric to evaluate a preferred path for routing of a message. The processor-based control may also be configured to: add the first link metric and the at least second link metric to determine a path metric; and utilize the path metric to select one of multiple communication paths for routing of the message.

An embodiment of a multi-path radio communications network for monitoring and controlling an industrial process has also been disclosed. The network includes a plurality of processor-based radio devices configured to wirelessly communicate in a mesh network wherein each radio communicates with multiple other radio devices in the mesh network. At least one of the plurality of processor-based radio devices is configured to: measure a signal strength value for a first communication link established through at least one neighbouring radio device; calculate a signal strength performance metric based on the measured signal strength of the first communication link; measure a traffic level value observed by the input/output device at the remote end of the first communication link; calculate a traffic level performance metric based on the measured traffic value of the device at the remote end of the first communication link; determine a link metric for the first communication link, based on the calculated signal strength performance metric and the calculated traffic level performance metric; and utilize the link metric to evaluate a preferred path for routing of a message.

Optionally, the determined link metric may be the product of the calculated traffic level performance metric and the calculated traffic level performance metric. The determined link metric may correspond to a value in a lookup table corresponding to the calculated traffic level performance metric and the calculated traffic level performance metric. The signal strength performance metric may be calculated in reference to threshold values provided in a signal strength table. The signal strength table may include a plurality of threshold signal strength values each arranged in positions 1 through x in the table, and the calculated signal strength performance metric corresponds to the position of the threshold value in the signal strength table that is closest to but higher than the measured signal strength value.

The traffic level performance metric may optionally be calculated in reference to threshold values provided in a traffic level table. The traffic level table may include a plurality of threshold traffic level values each arranged in positions 1 through y in the table, and the calculated traffic level performance metric may correspond to the position of the threshold value in the traffic level table that is closest to but lower than the measured traffic level value.

A communication path in the network may include the first communication link and at least a second communication link, and at least one of the plurality of processor-based radio device may be configured to: measure a signal strength value for the second communication link; calculate a signal strength performance metric based on the measured signal strength of the second communication link; measure a traffic level value observed by the input/output device at the remote end of the second communication link; calculate a traffic level performance metric based on the measured traffic value of the device at the remote end of the second communication link; determine a link metric for the second communication link, based on the calculated signal strength performance metric and the calculated traffic level performance metric; and utilize the second link metric to evaluate a preferred path for routing of a message.

At least one of the plurality of processor-based radio devices in the network may optionally be configured to: add the first link metric and the at least second link metric to determine a path metric; and utilize the path metric to select one of multiple communication paths for routing of the message.

An embodiment of a multi-path radio communications system has also been disclosed. The communications system includes: a plurality of processor-based radio devices configured to wirelessly communicate with one another in a mesh network having a frequency hopping spread spectrum topology, each of the plurality of processor-based radio devices configured to: measure a signal strength value for a first communication link established through at least one neighbouring radio; calculate a signal strength performance metric based on the measured signal strength for the first communication link; measure a traffic level value observed by the input/output device at the remote end of the first communication link; calculate a traffic level performance metric based on the measured traffic value of device at the remote end of the first communication link; determine a link metric for the first communication link, based on the calculated signal strength performance metric and the calculated traffic level performance metric; and utilize the link metric to evaluate a preferred path for routing of a message.

Each of the plurality of processor-based radio devices may further be configured to: identify a plurality of communication paths to a destination radio device, at least one the plurality identified communication paths including a multi-hop communication path including a plurality of communication links between respective ones of the plurality of processor-based radio devices; calculate link metrics for each respective link associated each of the multiple paths identified; accumulate the respective link metrics for each one of the multiple paths identified to determine respective path metrics of the multiple paths identified; and utilize the determined path metrics of the respective multiple paths identified to select a preferred communication path.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An input/output device comprising:
a radio frequency transmitter;
a radio frequency receiver; and
a processor-based control element configured to:
iteratively and dynamically determine a path metric for each of a plurality of possible multi-hop signal paths established with and between a plurality of neighbouring input/output devices to route a message to a desired destination in a radio transmission network, wherein the path metric for each of a plurality of possible multi-hop signal paths in the radio transmission network is based upon an approximate signal strength performance and an approximate traffic level performance associated with the neighbouring input/output devices without calculating an actual performance of each signal path, whereby the determined path metrics facilitate an estimated performance comparison of multi-hop signal paths of varying length in the radio transmission network; and
select, based on the determined path metrics for each of the respective multi-hop signal paths and regardless of the path length of the multi-hop signal paths, a preferred one of the multi-hop signal paths to route the message to the desired destination in the radio transmission network.

2. The input/output device of claim 1, wherein the processor-based control element in order to interactively and dynamically determine the path metric for each of the plurality of possible multi-hop signal paths is further configured to:
successively select each one of the plurality of possible multi-hop signal paths; and
for each selected one of the plurality of possible multi-hop signal paths:
successively select each one of a plurality of communication links that defines a part of the selected multi-hop signal path:
determine an approximate signal strength performance metric for the selected one of the plurality of communication links;
determine an approximate traffic level performance metric for the selected one of the plurality of communication links; and
based upon the approximate signal strength performance metric and the approximate traffic level performance metric, determine a link metric for each selected one of the plurality of communication links.

3. The input/output device of claim 2, wherein the processor-based control element is, for each selected one of the plurality of communication links, further configured to:
obtain a measured actual signal strength value for the selected one of the plurality communication links; and
compare the obtained measured actual signal strength value to a plurality of predetermined signal strength performance levels to determine the approximate signal strength performance metric for the selected one of the plurality communication links.

4. The input/output device of claim 3, wherein the plurality of predetermined and approximate signal strength performance levels are provided in a signal strength performance table accessible by the processor-based control element.

5. The input/output device of claim 4, wherein the plurality of predetermined signal strength performance levels are each respectively arranged in positions 1 through x in the signal strength performance table, and the approximate signal strength performance metric corresponds to the position of the predetermined signal strength performance level in the signal strength performance table that is closest to but higher than the obtained measured actual signal strength value.

6. The input/output device of claim 2, wherein the processor-based control element is, for each selected one of the plurality of communication links, further configured to:
obtain a measured actual traffic level value of a respective one of the neighbouring input/output devices at a remote end of the selected one of the plurality communication links; and
compare the obtained measured actual traffic level value to a plurality of predetermined traffic level performance thresholds to determine the approximate traffic level performance metric for the selected one of the plurality communication links.

7. The input/output device of claim 6, wherein the plurality of predetermined traffic level performance thresholds are provided in a traffic level performance table accessible by the processor-based control element.

8. The input/output device of claim 7, wherein the plurality of predetermined traffic level performance thresholds are each arranged in positions 1 through y in the traffic level performance table, and the approximate traffic level performance metric corresponds to the position of the traffic level performance threshold in the traffic level performance table that is closest to but lower than the obtained measured actual traffic level value.

9. The input/output device of claim 2, wherein the processor-based control element is further configured to multiply the approximate signal strength performance metric by the approximate traffic level performance metric to determine the link metric for each selected one of the plurality communication links.

10. The input/output device of claim 2, wherein the processor-based control element is configured to determine the link metric for each selected one of the communication links in reference to a two dimensional lookup table according to the approximate signal strength performance metric and the approximate traffic level performance metric.

11. The input/output device of claim 2, wherein at least one of the determined approximate signal strength performance metric and the determined approximate traffic level performance metric is an integer value.

12. A multi-path radio communications network for monitoring and controlling an industrial process, the network comprising:
a plurality of processor-based radio devices configured to wirelessly communicate in a mesh communication network, wherein each processor-based radio device communicates with multiple other ones of the plurality of processor-based radio devices in the mesh communication network; and
wherein at least one of the plurality of processor-based radio devices is configured to iteratively determine a path metric for each of a plurality of possible multi-hop signal paths established between neighbouring input/output devices in the mesh communication network, wherein at least one of the processor-based radio devices in order to iteratively determine the path metric is configured to:
successively select each one of the plurality of possible multi-hop signal paths; and
successively select each one of a plurality of communication links in the selected multi-hop signal path, and for each selected one of the plurality of communication links:
obtain a measured actual signal strength value for the selected one of the plurality of communication links;
compare the obtained measured actual signal strength value to a plurality of predetermined signal strength performance levels to determine an approximate signal strength performance metric for the selected one of the plurality of communication links;
obtain a measured actual traffic level value of a respective one of the neighbouring input/output devices at a remote end of the selected one of the plurality of communication links;
compare the obtained measured actual traffic level value to a plurality of predetermined traffic level performance thresholds to determine an approximate traffic level performance metric for the selected one of the plurality of communication links; and
determine, without calculating an actual performance of the selected communication link, a link metric utilizing both of the approximate signal strength performance metric and the approximate traffic level performance metric for the selected one of the plurality of communication links.

13. The multi-path radio communications network of claim 12, wherein the at least one of the processor-based radio devices is further configured to:
utilize the determined link metric for the selected communication links in each selected multi-hop signal path to evaluate an estimated performance of each of the plurality of possible multi-hop signal paths; and
select, based upon the evaluated estimated performance of each of the plurality of possible multi-hop signal paths and without regard to path length, a preferred multi-hop signal path to route a message to a destination in the mesh communication network.

14. The multi-path radio communications network of claim 13, wherein the at least one of the processor-based radio devices is further configured to:
add the determined link metrics for each communication link in each of the plurality of possible multi-hop signal paths to determine a path metric for each one of the plurality of possible multi-hop signal paths; and
compare the added determined path metrics of each one of the plurality of possible multi-hop signal paths to select a preferred one of the plurality of possible multi-hop signal paths to route the message to the destination.

15. The multi-path radio communications network of claim 12, wherein the processor-based control element is further configured to multiply the approximate signal strength performance metric by the approximate traffic level performance metric to determine the link metric for the selected communication link.

16. The multi-path radio communications network of claim 12, wherein the processor-based control element is configured to determine the link metric for each selected communication link in reference to a two dimensional lookup table according to the approximate signal strength performance metric and the approximate traffic level performance metric.

17. The multi-path radio communications network device of claim 12, wherein the plurality of predetermined signal strength performance levels are provided in a signal strength performance table accessible by the processor-based control element.

18. The multi-path radio communications network of claim 17, wherein the plurality of predetermined signal strength performance levels are each respectively arranged in positions 1 through x in the signal strength performance table, and the approximate signal strength performance metric corresponds to the position of the predetermined signal strength performance level in the signal strength performance table that is closest to but higher than the obtained measured actual signal strength value.

19. The multi-path radio communications network of claim 12, wherein the plurality of predetermined traffic level performance thresholds are provided in a traffic level performance table accessible by the processor-based control element.

20. The multi-path radio communications network of claim 19, wherein the plurality of predetermined traffic level performance thresholds are each arranged in positions 1 through y in the traffic level performance table, and the approximate traffic level performance metric corresponds to the position of the traffic level performance threshold in the traffic level performance table that is closest to but lower than the obtained measured actual traffic level value.

21. The input/output device of claim 12, wherein at least one of the determined approximate signal strength performance metric and the determined approximate traffic level performance metric is an integer value.

22. A multi-path radio communications system comprising:
a plurality of processor-based radio devices configured to wirelessly communicate with one another in a mesh communication network having a frequency hopping spread spectrum topology, each of the plurality of processor-based radio devices being configured to:
successively select each one of a plurality of possible multi-hop signal paths to route a message to a desired destination in the mesh communication network;
successively select each one of a plurality of communication links in the selected one of the plurality of possible multi-hop signal paths, and for each selected one of the plurality of communication links:
obtain a measured actual signal strength value for the selected one of the plurality of communication links;
compare the obtained measured actual signal strength value to a plurality of predetermined signal strength performance levels to determine an approximate signal strength performance metric for the selected one of the plurality of communication links;
obtain a measured actual traffic level value of a respective one of the neighbouring input/output devices at a remote end of the selected one of the plurality of communication links;
compare the obtained measured actual traffic level value to a plurality of predetermined traffic level performance thresholds to determine an approximate traffic level performance metric for the selected one of the plurality of communication links; and
determine a link metric for the selected one of the plurality of communication links utilizing both of the approximate signal strength performance metric and the approximate traffic level performance metric for the selected one of the plurality of communication links; and
utilize the determined link metric for the selected communication links in each one of the plurality of possible multi-hop signal paths to evaluate an estimated performance of each one of the plurality of possible multi-hop signal paths without calculating an actual performance each one of the plurality of possible multi-hop signal paths; and
select, based upon the evaluated estimated performance of each of the plurality of possible multi-hop signal paths and without regard to path length, a preferred one of the plurality of possible multi-hop signal paths to route the message to the desired destination in the mesh communication network.

23. The multi-path radio communications system of claim 22, wherein each of the processor-based radio devices is further configured to:
add the determined link metrics for each one of the plurality of communication links in each of the plurality of possible multi-hop signal paths to determine the path metric for each one of the plurality of possible multi-hop signal paths; and
compare the path metrics of each one of the plurality of possible multi-hop signal paths to the desired destination.

24. The multi-path radio communications system of claim 23, wherein the plurality of predetermined traffic level performance thresholds and the plurality of predetermined signal strength thresholds are each provided in a table accessible by each of the processor-based radio devices.

25. The multi-path radio communications system of claim 24, wherein the table is a two dimensional lookup table.

26. The multi-path radio communications system of claim 24, wherein the plurality of predetermined traffic level performance thresholds and the plurality of predetermined signal strength performance levels are each arranged in positions 1 through n in the table, wherein the approximate traffic level performance metric corresponds to the position of the traffic level performance threshold in the traffic level performance table that is closest to but lower than the obtained measured actual traffic level value, and wherein the approximate signal strength performance metric corresponds to the position of the predetermined signal strength performance level in the signal strength performance table that is closest to but higher than the obtained measured actual signal strength value.

27. The input/output device of claim 1, wherein the processor-based control element is further configured to select a preferred one of the multi-hop signal paths while accounting for cross-correlation between signal strength performance and traffic level performance.

28. The multi-path radio communications network of claim 12, wherein the at least one of the plurality of processor-based radio devices is configured to determine a link metric while accounting for cross-correlation between signal strength performance and traffic level performance.

29. The multi-path radio communications system of claim 22, wherein each of the plurality of processor-based radio devices is further configured to determine a link metric while accounting for cross-correlation between signal strength performance and traffic level performance.

* * * * *